United States Patent

[11] 3,533,499

| [72] | Inventor | Andrew J. Harkess<br>Edgewater, New Jersey |
|---|---|---|
| [21] | Appl. No. | 730,218 |
| [22] | Filed | May 20, 1968 |
| [45] | Patented | Oct. 13, 1970 |
| [73] | Assignee | Hewitt-Robins Incorporated<br>Stamford, Connecticut |

[54] FRICTION DRIVE ASSEMBLY
2 Claims, 2 Drawing Figs.

[52] U.S. Cl. .................................................. 198/203
[51] Int. Cl. .................................................. B65g 23/22,
B65g 23/32
[50] Field of Search .................................... 198/184, 203

[56] References Cited
UNITED STATES PATENTS

| 2,114,716 | 4/1938 | Kunzle | 198/203X |
| 2,357,651 | 9/1944 | Hapman | 198/203 |
| 3,442,369 | 5/1969 | Harkess | 198/184 |

Primary Examiner—Richard E. Aegerter
Assistant Examiner—W. Scott Carson
Attorney—John L. Shortley and John D. Boos ABSTRACT: A friction drive assembly is disclosed which is used for driving a belt-type tension member which, for example, might be on a suspended conveyor or a belt train. The drive assembly is made up of two friction drive units mounted on support means which are pivotally mounted from an overhead support structure. An adjustment means, such as a turn buckle, couples the two support means together and is employed to vary the amount of force which the opposed friction drive members contact the belt. In this manner, an adjustment means is provided for varying the amount of friction which is generated between the drive members and the tension member.

INVENTOR
ANDREW J. HARKESS
BY
ATTORNEY

FRICTION DRIVE ASSEMBLY

BACKGROUND OF THE INVENTION

The development of suspended conveyors, as disclosed in U.S. Pat. No. 3,442,369, and suspended belt trains, as disclosed in U.S. Pat. application Ser. No. 726,781, has also created the need for a drive system capable of moving either the suspended conveyor or the belt train at high speeds.

Prior art drive systems in the suspended conveyor art have proposed the use of a separate tension member in the form of a chain which is coupled at spaced locations to the conveyor and which is driven by one or more rotatably driven sprockets that are mounted around the path of the system. The ultimate driving speed of a chain-type tension number is somewhat limited by the fact that it is a series of mechanically interconnected links which require a substantially perfect mesh with the drive sprockets if excessive localized stresses are to be avoided in the tension member. U.S. Pat. application Ser. No. 640,083 has partially solved this drive problem by providing a belt-type tension member which is coupled to the suspended conveyor and which is driven by spaced friction drive means located around the path of the system.

Belt trains have heretofore generally operated with tractors pulling the vehicles over the rail system and the weight of this type of drive tractor frequently creates point loads on the rail system which is greater than those created by the weight of a fully loaded belt train. In order to avoid this problem, a drive system having a separately driven belt-type tension member has been proposed in U.S. Pat. application Ser. No. 726,781 which is also actuated by friction drive means positioned at spaced locations around the system.

One of the basic problems with friction drive systems of the type described above is equalizing, and adjusting for, the slippage that may result at each of the friction drive assemblies in the system. The amount of friction which is developed between the rotating wheel-type drive members of the assembly and the flexible tension member ultimately determines the amount of positive drive that will result under any given load condition. For example, it may be that one revolution of the friction drive members of an assembly will pull the tension member through a linear distance equal to 90 percent the circumferential distance of the drive member. In this case, then, the remaining 10 percent of the revolution will represent the amount of slippage of the drive members against the tension member. It will be recognized that this slippage of the drive members against the tension member is undesirable in that it will abrade and wear both friction surfaces.

It is obviously desirable to minimize slippage and thereby minimize wear, however, it will also be recognized that it is necessary to adjust and equalize, if possible, the amount of slippage of each drive assembly in the system so that there is no tendency to stretch the tension member. This is particularly a problem where loading conditions of the conveyor or belt train may vary from fully loaded to empty and where the rail system may include horizontal stretches combined with upward or downward inclines.

SUMMARY OF THE INVENTION

The drive assembly of the present invention has friction drive units mounted on support means which are pivotally mounted from a stationary support structure. Each assembly comprises a rotatably driven friction drive member mounted on opposite sides of, and in contact with, a belt-type tension member. An adjustment means couples the pivotally mounted support means together and enables easy adjustment of the amount of force which the opposed drive members contact the tension member. In this manner, the amount of friction developed between the friction drives can be varied.

Accordingly, one object of this invention is to provide a friction drive assembly for driving a belt-type tension member.

Another object is to provide a friction drive assembly for driving a belt-type tension member and having means for adjusting the amount of friction developed between the friction drive members and the belt-type tension member.

Still another object is to provide a friction drive system for either a suspended conveyor or belt train and having adjustable friction drive assemblies operating on belt-type tension members.

BRIEF DESCRIPTION OF THE DRAWINGS

Other objects, advantages and novel features of the present invention will become apparent in the following detailed description of the invention when considered in conjunction with the following drawings wherein.

DETAILED DESCRIPTION OF THE PREFERRED EMBODIMENT

Figure 1:
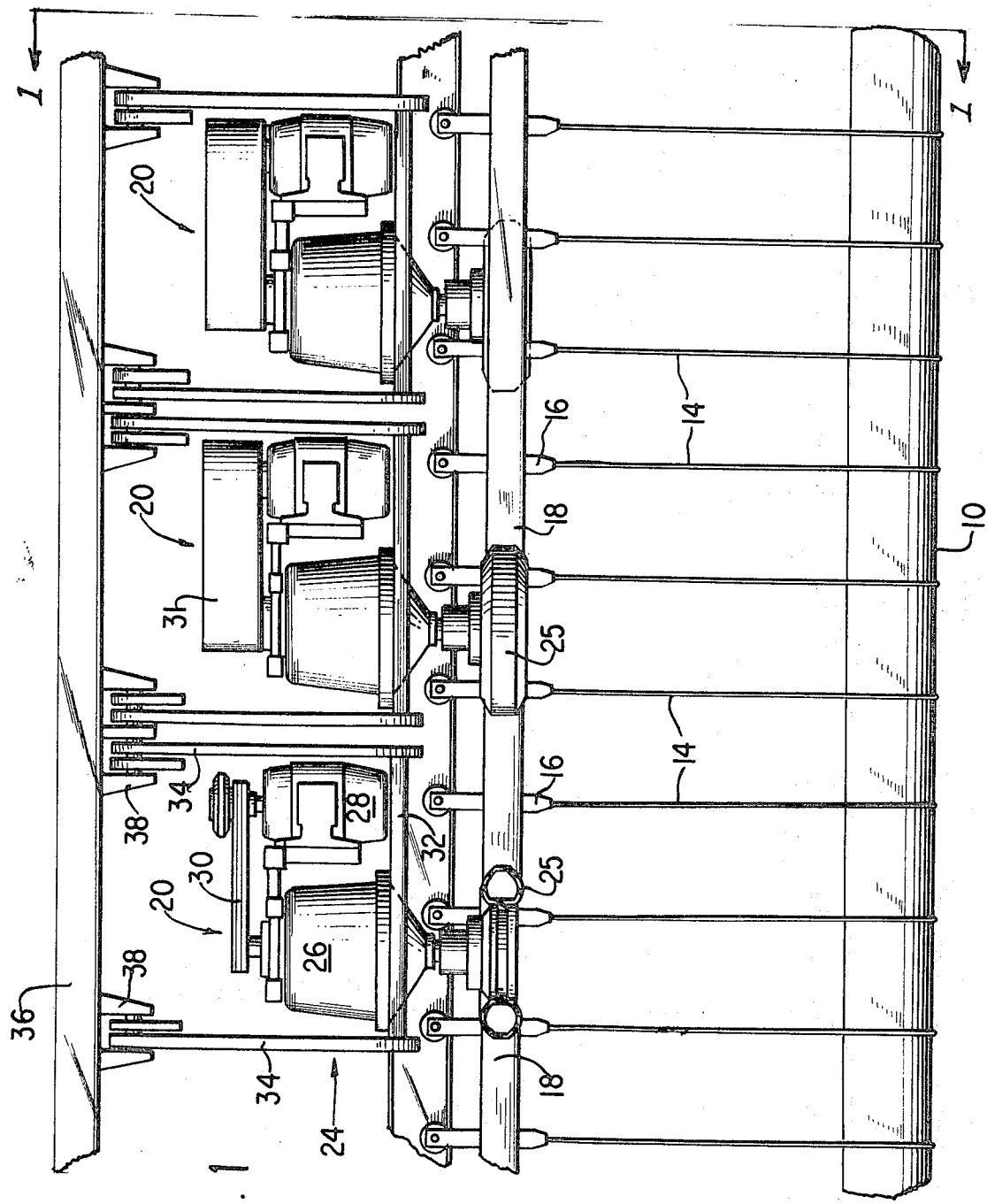
FIG. 1 is a side view, with parts broken away, of a section of a suspended conveyor showing a typical bank of friction drive assemblies of the present invention.

The drawings show the friction drive assemblies of the present invention employed on a suspended conveyor system of the type fully described in U.S. Pat. application Ser. No. 640,083. The system basically comprises a conveying means, such as endless conveyor belt 10, suspended from an overhead closed loop rail system 12 by a plurality of spaced apart supporting slings 14 connected to trolleys 16 that ride on the rail system. A flexible tension member 18 interconnects the trolleys and is driven by the friction drive assemblies 20 of the present invention. The tension member is, for example, steel cable reinforced belting, and extends around the entire path of the suspended conveyor system. A typical operation of the suspended conveyor system would be, for example, to have the belt loaded at a loading station, not shown, at one end of the closed loop rail system and then travel loaded, as shown on the left side of FIG. 2 to an unloading station, also not shown, at the opposite end of the loop and the belt would then return empty, as shown on the right side of FIG. 2, to the loading station.

Each friction drive assembly is made up of two friction drive units 22 mounted on support means 24 located on opposite sides of the tension member. Each drive unit comprises a wheel-type friction drive member 25 coupled to the output shaft of reducer 26 and is rotatably actuated by motor 28 through V-belt drive 30. The friction drive members 25 are, for example, pneumatic tires. A housing 31 covers the top of motor and reducer in order to protect the V-belt drive.

The friction drive members in each assembly are arranged so that peripheral surfaces thereof contact opposite sides of belt 18 and thereby pinching the belt between the opposed drive members. When the opposed drive members are rotatably driven in opposite directions, they tend to impart linear motion to the belt pinched therebetween. The amount of friction developed between the drive members and the belt will determine the amount of slippage and the amount of positive drive which will result from this type of drive under any given load conditions.

Figure 2:
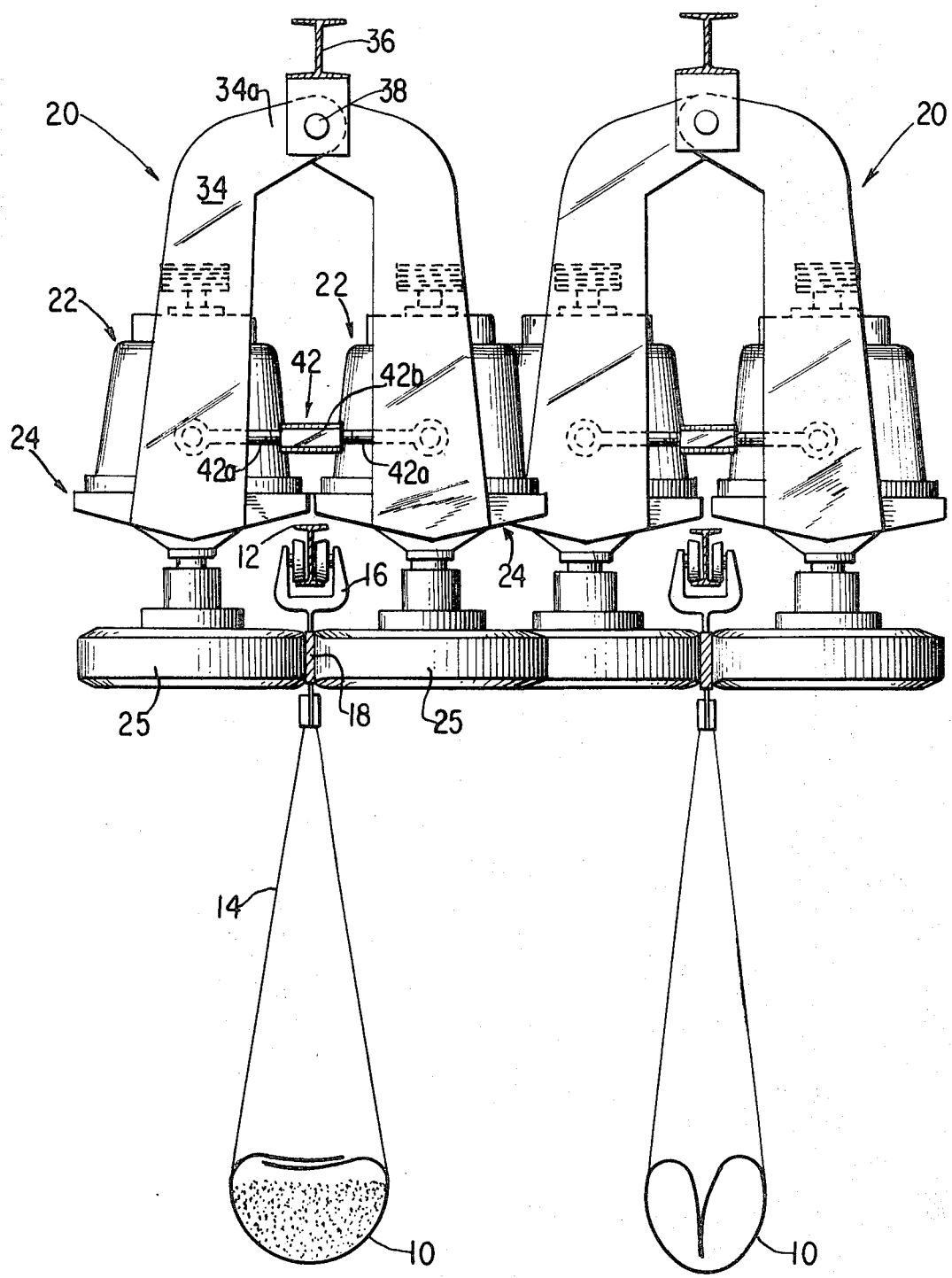
FIG. 2 is a cross-sectional view taken along line 1—1 of FIG. 1.

Each support means 24 is made up of a platform 32 having upwardly extending arms, 34 mounted at each end of the platform as viewed in FIG. 2. The upper end of the arms are formed with an offset portion 34a so that the support means on opposite sides of the belt can be pivoted about a common axis which lies in substantially the same vertical plane as the tension member. Thus, as viewed in FIG. 2, the arms on the left hand side of the belt are offset to the right while the arms on the right hand side of the belt are offset to the left. The upper ends of the arms of the two support means for each drive assembly are pivotally coupled to an independent support structure 36 by means of conventional hinge pin connections 38 and which connections permit the support means to be moved relative each other toward and away from the tension member.

As seen in FIG. 2, the two support means 24 in each drive assembly are pulled toward each other by adjustment means 42 which is shown, for example, as a turnbuckle device 42.

Specifically, screw elements 42a are pivotally coupled to opposed support means and are arranged so that the axes of the screw elements can be aligned to permit the turnbuckle 42b to be screwed onto both elements.

By tightening the turnbuckle, it is possible to draw the opposed support means toward each other as the support means pivot about the common axis of their hinge connections 38. Thus, it is possible to increase the normal force which the drive members exert on the tension member and it is thereby possible to increase the amount of friction developed between the tension member and the drive members.

In operation, the friction drive assemblies of the present invention would be located at spaced locations around the path of the conveyor system. In those locations where the drive assemblies would normally be driving the loaded conveyor the turnbuckles would be adjusted to develop a large amount of friction between the drive members and the tension member. In this manner slippage between, and the resulting wear on, the drive means and the tension member would be reduced. If the drive assemblies are, on the other hand, positioned in a location where they would normally be required to drive an unloaded section of the conveyor, then the turnbuckle would be again adjusted so that the slippage generated by the drive assemblies in the unloaded section of the system is substantially the same as the slippage generated by the drive assemblies in the loaded or on the upwardly inclined sections of the system. Likewise, the adjustment means would enable a bank or group of drive assemblies, as shown in FIG. 1, to be adjusted so that the slippage at the drive members of each assembly would also be substantially the same. It will be apparent that the drive assemblies in the suspended conveyor system can be adjusted so that there is either no slippage or that the slippage will be substantially the same at every drive assembly in the system and that in this manner the wear rate created by any of the drive assemblies can be adjusted to be substantially equal. This adjustment means also facilitates compensating for one or more drive assemblies being taken out of the system for maintenance or repair purposes by allowing the amount of drive friction developed by the remaining drive assemblies to be increased. Finally, it will be noted that the adjustment means readily permits compensation for any wear experienced by either the drive members or the tension member.

It will be apparent that the friction drive assembly of the present invention permits adjustment of the amount of friction developed between the friction drive means and the belt-type tension member. While the drive assembly has been disclosed in a suspended conveyor system, it will be recognized that it can be employed to drive the belt train systems described in U.S. Pat. application Ser. No. 726,781 and in any drive system where a vehicle is driven through a fixed path by friction drive assemblies operating on a flexible tension member. Likewise, while turnbuckle devices 42 have been disclosed as the preferred type of adjustment means, it will be obvious that a broad range of equivalent mechanical, electrical or hydraulic devices could be employed, to position the support means relative to each other and typical examples would include jack or ratchet mechanisms, solenoid type mechanisms and hydraulically actuated clamping devices.

Obviously many additional modifications and variations of the present invention are possible in light of the above teachings. It is therefore to be understood that the invention may be practised otherwise than as specifically described.

I claim:

1. In a friction drive system for propelling a rail suspended conveyor means through a fixed path, said system having a flexible tension member coupled to said conveyor means, friction drive assemblies positioned at spaced locations around the fixed path for frictionally engaging and pulling said tension member, the improvement in each of said friction drive assemblies comprising:
   a. two rotatably driven friction drive members, each of said drive members being mounted from separate support means on opposite sides of said tension member, each of said support means being mounted for pivotal movement about a common axis toward and away from said tension member, said drive members positioned so as to squeeze said tension member when it is therebetween whereby said drive members can frictionally drive said tension member when said drive members are rotatably driven in opposite direction; and
   b. adjustment means coupled to both of said support means for changing the spacing between said drive members by moving at least one of said support means about said common pivotal axis whereby the amount of normal force with which said drive members contact said tension member can be varied.

2. The improvement described in claim 1 wherein said adjustment means consists of a turnbuckle device coupling both of said support means together, said turnbuckle device adapted to move said friction drive members either toward or away from said tension member.